Sept. 6, 1932.  S. O. SPURRIER  1,876,153
AERIAL TRANSPORTATION APPARATUS
Filed Sept. 2, 1930   4 Sheets-Sheet 2

INVENTOR.
Schuyler O. Spurrier
BY Lancaster, Allwine and Rommel
ATTORNEYS.

Sept. 6, 1932.    S. O. SPURRIER    1,876,153
AERIAL TRANSPORTATION APPARATUS
Filed Sept. 2, 1930    4 Sheets-Sheet 3

INVENTOR.
Schuyler O. Spurrier
BY Lancaster, Allwine and Rommel
ATTORNEYS.

Sept. 6, 1932.   S. O. SPURRIER   1,876,153
AERIAL TRANSPORTATION APPARATUS
Filed Sept. 2, 1930   4 Sheets-Sheet 4

INVENTOR.
Schuyler O. Spurrier
BY Lancaster, Allwine and Rommel
ATTORNEYS.

Patented Sept. 6, 1932

1,876,153

UNITED STATES PATENT OFFICE

SCHUYLER O. SPURRIER, OF CARNEGIE, OKLAHOMA

AERIAL TRANSPORTATION APPARATUS

Application filed September 2, 1930. Serial No. 479,305.

This invention relates to improvements in means for the bodily movement of large and heavy objects, such as buildings, from one location to another; the invention having particular reference to a dirigible aircraft and associated means for performing such function.

The primary object of the invention is the provision of an improved dirigible aircraft, preferably of the lighter-than-air variety, having improved releasable grappling and landing gear associated therewith for the expeditious and efficient lifting of a large building or the like, for the accomplishment of its transportation and accurate landing upon a foundation or the like.

Other objects and advantages of this invention will be apparent during the course of the following detailed description.

In the accompanying drawings, forming a part of this specification, and wherein similar reference characters designate corresponding parts throughout the several views.

Figure 1:
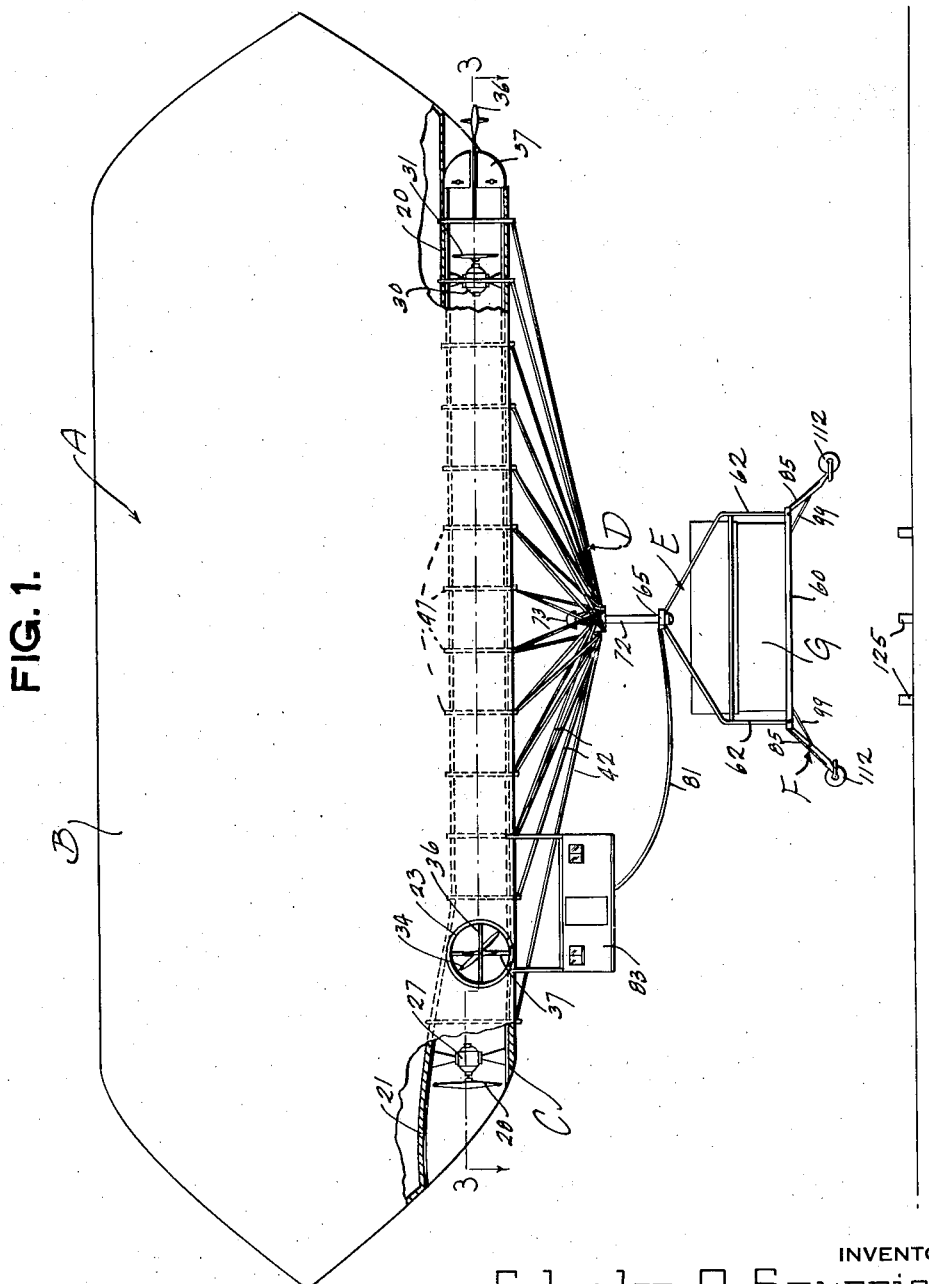
Figure 1 is a side elevation of the improved apparatus, showing it supporting a building in position above a foundation, prior to landing.
Figure 2:
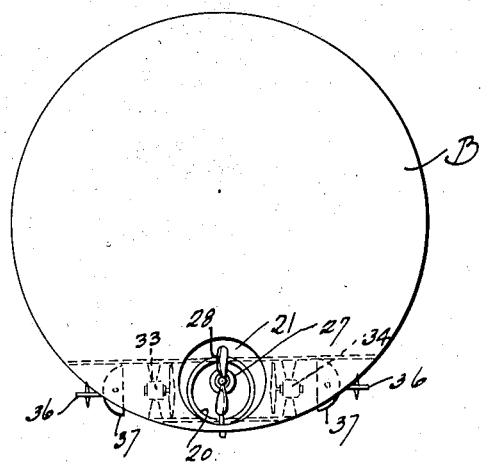
Figure 2 is a view of the fore end of the aircraft.
Figure 3:
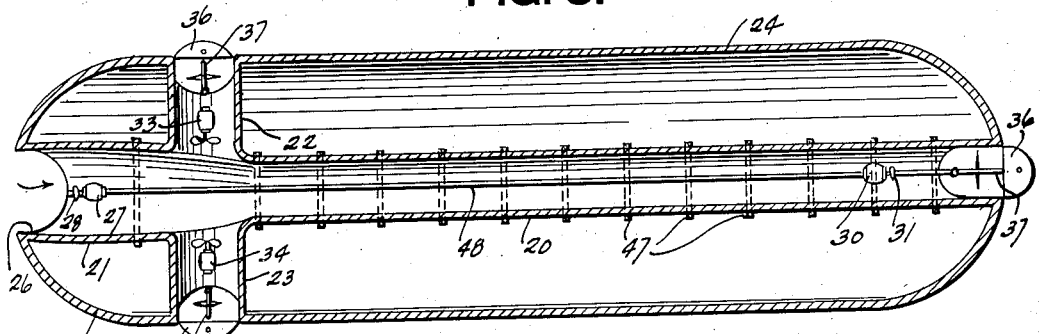
Figure 3 is a longitudinal sectional view through the lower portion of the aircraft, taken substantially on the line 3—3 of Figure 1.
Figure 10:
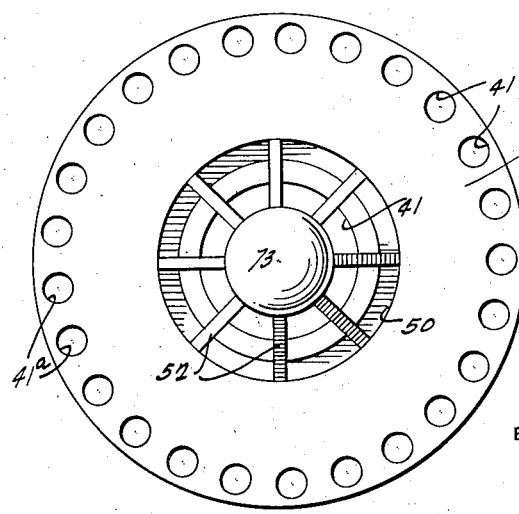
Figure 10 is a plan view of the concentrating supporting ring of the gear of the aircraft, to which the suspension wires or struts are connected.
Figure 4:
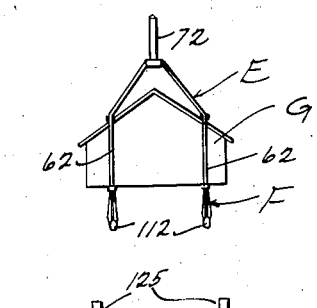
Figure 4 is a fragmentary view showing the end of the building and the supporting means by which it is connected to an aircraft.

In the drawings, wherein for the purpose of illustration is shown only a preferred embodiment of the invention, the letter A may generally designate the improved equipment for the dirigible transportation of large and heavy objects, such as buildings, which may consist of a preferably lighter-than-air craft, of the dirigible balloon type, which has an improved sub-structure C to which supporting gear D is operatively connected for releasable connection with the load attaching means E; the latter including improved shock absorbing landing gear F.

The aircraft B is preferably of the elongated cylindrical variety, although it is entirely possible to use a heavier-than-air craft, or a spherical or other shaped lighter-than-air craft. The lower construction C, which is directly attached and preferably enclosed in the envelope except for air outlets, is preferably of rigid construction, including an elongated rigid tube 20, which at one end 21 thereof, the same being an inlet end, is enlarged, and which adjacent said end is provided with diametrically opposed right angled extensions 22 and 23. The tubes 20, 22 and 23 may be fixedly connected at their ends by an enclosing rigid framework 24 if desired, to which the fabric of the envelope may be attached. The enlarged portion 21 of the longitudinal tube has an air inlet end 26, wherein an engine 27, driving a propeller 28, is operatively mounted. This engine is preferably of the tractor type, and under normal operation pulls air into the large end 21 of the tube and directs it longitudinally through the tube 20. Near the discharge end of the latter, the same is provided with a second engine 30 having a propeller 31; the same being of the pusher type and directing the air towards the discharge end of the tube 20. Adjacent the connection of the larger end with the normal cross section of the tube 20, are disposed the right angled tubes 22 and 23, wherein are respectively disposed engines 33 and 34 having propellers attached therewith for directing the air from the tube 20 for discharge through the tubes 22 and 23.

The tubes 20, 22 and 23 at the discharge ends thereof are provided with suitable elevators 36, and suitable rudders 37, which may be connected for operation in any suitable conventional manner (not shown).

The supporting gear D preferably comprises a concentrating ring or member 40 centrally provided with an opening 41 therein and peripherally provided with transverse openings 41ᵃ through which supporting struts or wires 42 are connected; the said wires 42 divergently extending for connection at their upper ends thru suitable eyelets (not shown) attached at the lower ends of circular girders 47 which encompass the tube 20 throughout the length thereof. The tube 20 is additionally strengthened by elongated girders 48 which extend through the length of the tubes 20 and are attached thereto in any approved manner. The concentrating ring 40 on the upper surface thereof is provided with an annular groove 50, the bottom of which slopes divergently downward, and which is adapted to releasably receive the lower ends of collapsible detent arms 52 of the load attaching means E to be subsequently described.

Figure 5:
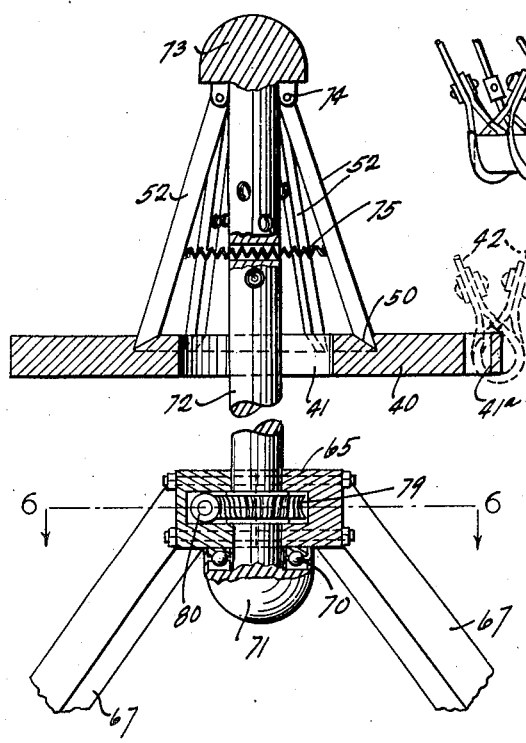
Figure 5 is a fragmentary view, partly in section, showing the releasable means by which the load is connected to the aircraft.

The load attaching means E preferably comprises two or more rigid beams 60, preferably of structural steel or other material, which are adapted to receive the building or load G directly thereon. These beams 60 extend beyond the ends of the load and there are provided with upwardly extending supporting rods 62, preferably secured by pivot points 63 to the ends of the beams. These rods 62 may be of flexible cable material if desired, and they extend upwardly for connection with a rotary member 65. This rotary member 65 preferably has downwardly extending divergently rigidly connecting arms 67 to which the rods or cables 62 may be fixedly connected. The member 65 is rotatably supported upon an anti-friction bearing 70, upon the lower enlarged end 71 of a vertical shaft 72. The said shaft 72 has a head 73 at the top thereof with depending ears to which the detent arms 52 are pivotally connected at 74. These detent arms 52 are normally collapsed against the shaft 72 by means of diametrically disposed springs 75 connected with opposed arms 52 in the relation shown in Figure 5. The detents may be expanded in any approved manner so that their lower ends may releasably seat in the upper grooved face 50 of the concentrating disc 40, as shown in Figure 5, for supporting the load and its attaching means from the supporting gear D, as is quite apparent. The rotatable box 65 is preferably of two-piece construction, detachably connected at 78. The shaft 72 within the compartment of this box has a worm gear 79 keyed with said shaft, with which meshes a worm 80 journalled at 81 in the box 65. The worm gear 80 has a shaft end extending from the box to which is connected a flexible drive shaft 81 by means of a universal joint 82. The flexible drive shaft 81 extends into the cabin or gondola 83 supported below the dirigible B, and in the cabin is suitably connected to any approved power source.

Figure 12:
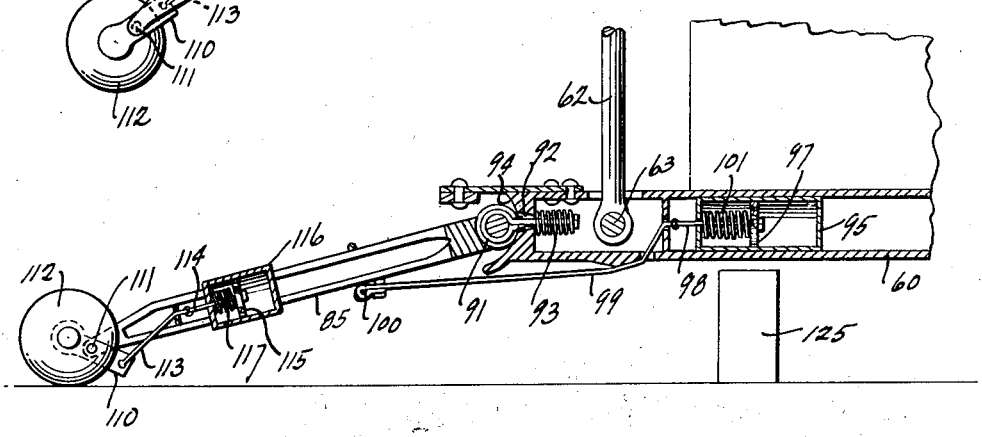
Figure 12 is a sectional view of the parts of Figure 11, showing the cooperating details of the landing gear after the making of a landing and just prior to the coming of the load into rest upon a foundation.
Figure 13:
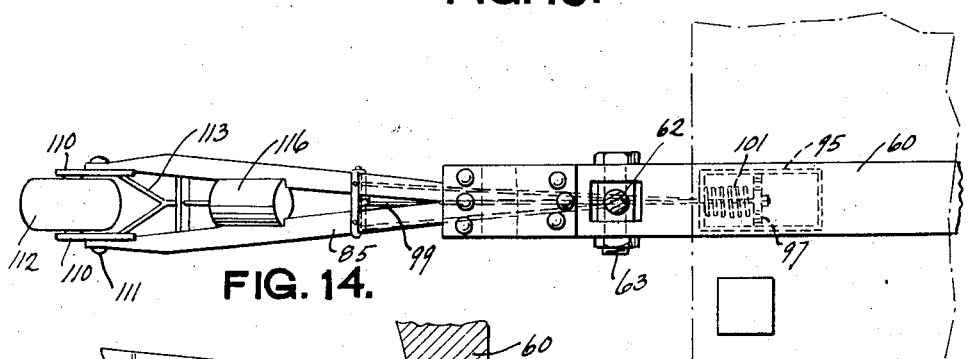
Figure 13 is a plan view of the details shown in Figure 12.
Figure 14:
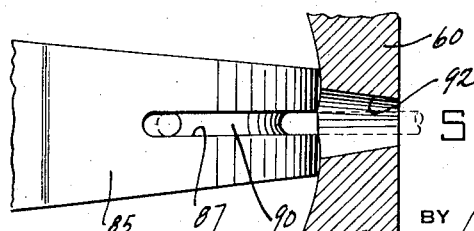
Figure 14 is a fragmentary view, partly in section, of the details of a jointed connection of a supporting leg of the landing gear with the base or frame structure thereof.

Improved shock absorbing and landing gear F is connected to the beams 60. This gear preferably consists in the placement at the end of each of the beams 60 of a strong and durable leg 85, which at its mounting end is provided with an annular groove and passageway 87, shown in Figure 14, providing a short shaft 90 which rotatably receives an eye bolt 91 therein, as shown in Figure 12. This eye bolt 91 has its shank extending through a tapered passageway 92 in the end of the beam, and within the beam has a compressed spring 93 thereon normally urging the rounded end of the leg 85 into the concave socket 94 in the end of the beam. The spring 93 and the shank of the eye bolt mounted in the tapered passageway 92 enables a certain degree of shock-absorbing movement of the mounting end of the leg 85 relative to the end of the beam, as can readily be understood.

The leg 85 is normally held in an inclined position extending below the beam 60 at an obtuse angle with respect thereto by the action of the spring urged eye bolt 91 in combination with a shock absorbing and recoil mechanism consisting of a cylinder 95 mounted in the hollow beam 60 and having a perforated piston 97 operating therein. A piston rod or stem 98 extends axially from an end of the cylinder 95 and has a flexible cable 99 connected therewith; the other end of the cable 99 being connected at 100 intermediate the ends of the leg 85. In the cylinder 95 between the piston 97 and the end of the cylinder through which the piston rod 98 extends is disposed a compressed spiral spring 101, which normally urges the piston 97 away from the leg 85, for the purpose of tensioning the cable 99 and pulling the leg 85 downwardly to a maximum extended and inclined position. It is quite apparent that upon landing of the gear the leg 85 will receive the initial shock which is absorbed by further tensioning of the cable 99 and spring 101, moving the piston 97 in the fluid chamber 95. The cylinder or chamber 95 preferably receives glycerine or some other like fluid or liquid, which gradually leaks through the perforations in the piston 97 in a manner and for a purpose which is quite apparent to those skilled in this art.

The leg 85 near its outer or ground contacting end is preferably provided with additional shock absorbing means. This includes a lever 110, pivoted intermediate its ends at 111 upon the free end of the leg 85. One end of the lever 110 has a landing wheel 112 rotatably mounted thereon, the opposite end of the lever at the opposite side of the pivot 111 has a flexible cable 113 connected therewith, which leads to a shock absorbing cylinder and is connected to the rod 114 of a piston 115 which operates within a fluid cylinder 116 in the same manner and for the same purpose as the leg 85 is connected to the cable 99 with the piston 97 in the cylinder 95. A spring 117 in the cylinder 116 normally urges the piston 115 to reset position; said piston being perforated for reasons above mentioned.

Figure 7:
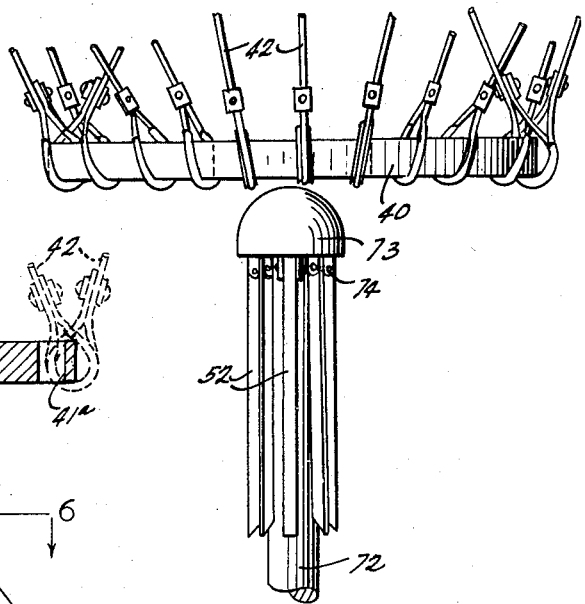
Figure 7 is a fragmentary view showing the means connected to the load released from the aircraft supporting gear.
Figure 6:
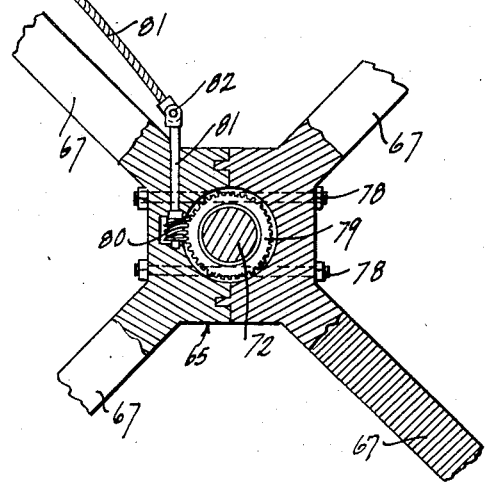
Figure 6 is a fragmentary sectional view taken substantially on the line 6—6 of Figure 5.
Figure 8:
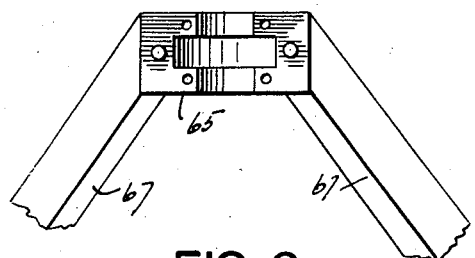
Figures 8 and 9 are views showing details of the parts illustrated in Figures 5 and 6.
Figure 9:
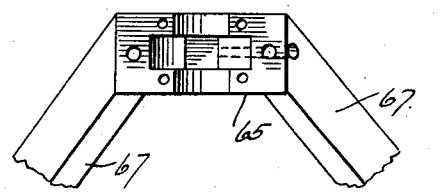
Figure 11:
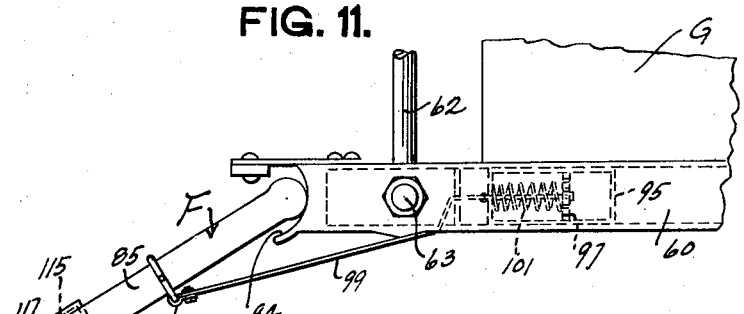
Figure 11 is an end view showing a detail of the shock absorbing landing gear.

In the operation of the apparatus, the load G is attached in manner which is perfectly apparent, at the location from which it is to be transported. It is conveyed by the aircraft to the location at which it is to be released, and there the aircraft B is maneuvered, by means of its engine, into initial position, and the final adjustment of position to which the load is shifted just prior to its release is taken care of through the medium of the rotating flexible shaft 81 which is operated to swing the load G to the desired angle. In the preferred instance the apparatus is used for transferring buildings from a location where they may be conveniently constructed to a foundation built at some other location. The foundation is represented in the drawings by means of piles 125, upon which the building G is to be set. The initial adjustment of the building into place is secured by maneuvering the aircraft B. Of course, operation of the engines 27 and 30 will drive the dirigible B longitudinally to the desired location, and through operation of the engines 33 and 34 the aircraft may be angularly shifted to secure the initial adjustment of the load to position. Thereafter the power source in the cabin operates the flexible shaft 81 for rotating the load attaching means E in a manner which is perfectly apparent, to secure the final adjustment, and thereafter the dirigible is lowered to set the building G upon the foundation. The landing gear F, above described, takes the shock of landing and prevents damage to the load, as will be quite apparent, inasmuch as the landing wheels 111 contact the ground or other surface prior to the time that the beams 60 or the load G comes into contact with the foundation 125 upon which the load is to be set. As soon as the load G has set upon the foundation it is perfectly apparent that the concentrating ring 40, shown in Figure 5, will drop along the shaft 72, and as soon as that happens the spring 75 will collapse the detents 52 to the position shown in Figure 7 and permit the detents as well as the shaft 72 to pass through the opening 41 of the concentrating ring 40 as soon as the aircraft is again elevated. Thus, there is an automatic release of the load from the aircraft.

Various changes in the shape, size, and arrangement of parts may be made to the form of invention herein shown and described, without departing from the spirit of the invention or the scope of the claims.

I claim:

1. In aerial transportation apparatus the combination of a dirigible aircraft, load attaching means, means to releasably connect the load attaching means to the dirigible aircraft, and means for rotatably shifting the load attaching means with respect to the dirigible aircraft.

2. In aerial transportation apparatus the combination of a lighter-than-air craft, means to move said craft longitudinally, means to move said craft laterally about a vertical axis intersecting the craft, load attaching means, means connected with the aircraft for releasably supporting said load attaching means, and other means to rotate said load attaching means and its load bodily about a vertical axis and relative to said aircraft.

3. In a dirigible aircraft the combination of a gas bag, an elongated hollow metal tube connected with the gas bag, laterally extending tubes connected with the elongated hollow metal tube, power driven propellers in said elongated tube and said lateral tubes for drawing air into one end of the elongated tube and passing it longitudinally through the elongated tube and laterally through the lateral tubes selectively, and rudder and elevator means associated with the air passage at the discharge end of said tubes.

4. In a dirigible aircraft the combination of a gas bag, an elongated hollow metal tube connected with the gas bag, laterally extending tubes connected with the elongated hollow metal tube, power driven propellers in said elongated tube and said lateral tubes for drawing air into one end of the elongated tube and passing it longitudinally through the elongated tube and laterally through the lateral tubes selectively, rudder and elevator means associated with the air passage at the discharge end of said tubes, and load supporting means connected with said aircraft.

5. In a dirigible aircraft the combination of a gas bag, an elongated hollow metal tube connected with the gas bag, laterally extending tubes connected with the elongated hollow metal tube, power driven propellers in said elongated tube and said lateral tube for drawing air into one end of the elongated tubes and passing it longitudinally through the elongated tube and laterally through the lateral tubes selectively, rudder and elevator means associated with the air passage at the discharge end of said tubes, load supporting means connected with said aircraft, and means for rotatably adjusting the load supporting means relative to said aircraft.

6. In means for supporting loads from an aircraft and the like the combination of a supporting ring, a load attaching shaft extending through the ring, and normally collapsed detent means on the shaft adapted to engage the ring to connect the shaft releasably with the ring.

7. In means for supporting loads from an aircraft and the like the combination of a supporting ring, a load attaching shaft extending through the ring, normally collapsed detent means on the shaft adapted to engage the ring to connect the shaft releasably with the ring, and a rotatable load attaching device rotatably connected with said shaft.

8. In means for supporting loads from an aircraft and the like the combination of a supporting ring, a load attaching shaft extending through the ring, normally collapsed detent means on the shaft adapted to engage the ring to connect the shaft releasably with the ring, a rotatable load attaching device rotatably connected with said shaft, and means to rotate said device relative to said shaft.

9. In apparatus of the class described the combination of an aircraft, load supporting and attaching means, means connecting the load supporting and attaching means releasably with the aircraft for automatic release therefrom upon landing of the load, and shock absorbing landing gear connected with said load attaching means.

10. In aerial transport apparatus the combination of load supporting and attaching means including a frame, movable legs connected in a movable relation with the frame and extending downwardly therefrom inclined thereto at an angle greater than a right angle, shock absorbing means connecting said legs with said frame, a rotatable wheel eccentrically connected with the outer end of each leg, and shock absorbing means resiliently holding the eccentric position of the wheels upon the respective legs.

11. In aerial transport apparatus the combination of an aircraft, load attaching means, detent means releasably connecting the load attaching means to the aircraft, and means to automatically collapse said detent means and effect a release upon the initial lifting of the weight of the load from the aircraft.

12. In aerial transportation apparatus the combination of an aircraft and a load carrying and transporting frame detachably coupled thereto, including a platform of a nature to receive a substantial portion of a building thereon, said frame arranged to permit said building to project over the edges of said platform.

13. In aerial transportation apparatus the combination of an aircraft, load supporting means, means to releasably connect the load supporting means to the aircraft, and means for rotatably shifting the load supporting means with respect to the aircraft to face the load in a desired direction.

14. In aerial transportation apparatus the combination of an aircraft, means for releasably attaching a load to the aircraft such as a bulky heavy building construction, means for lateral and vertical directional control of the aircraft to position the load upon a desired foundation or support, means to rotate the load for facing it in a desired direction while the load is suspended from the aircraft, and means to laterally shift the load for short distances with respect to the ground surface after landing.

15. In aerial transport apparatus the combination of a load supporting and attaching structure including a frame, legs movably connected with the frame, shock absorbing means for the legs and frame, and means for laterally shifting the frame for short distances with respect to the ground when the legs are supporting the frame upon the ground.

16. In aerial transport apparatus the combination of a load supporting frame, legs movably connected with the frame, shock absorbing means connecting the legs with the frame to absorb the shock of landing as the legs are moved with respect to the frame, a shock absorbing landing wheel, and means connecting the wheel with the leg so as to further absorb the shock of landing.

SCHUYLER O. SPURRIER.